United States Patent [19]
Wu et al.

[11] Patent Number: 6,150,454
[45] Date of Patent: Nov. 21, 2000

[54] POLY(TEREPHTHALIC ACID DIESTER)-POLY(ISOPHTHALIC ACID DIESTER) RESIN FORMULATIONS HAVING IMPROVED GAS BARRIER PROPERTIES

[75] Inventors: Audrey C. Wu, Greenville, S.C.; Xiaoyan Huang, Gastonia, N.C.; Jim Schwietert, Spartanburg, S.C.

[73] Assignee: Arteva North America S.A.R.L., Zurich, Switzerland

[21] Appl. No.: 09/185,237

[22] Filed: Nov. 3, 1998

[51] Int. Cl.⁷ .................................................. G08K 3/00
[52] U.S. Cl. ........................ 524/492; 524/394; 524/396; 524/400
[58] Field of Search ................................... 524/394, 396, 524/400, 492

[56] References Cited

U.S. PATENT DOCUMENTS 4,234,708  11/1980  Edelman et al. .................. 525/444

*Primary Examiner*—Edward J. Cain
*Attorney, Agent, or Firm*—Gregory N. Clements

[57] ABSTRACT

The invention is directed to improved poly(terephthalic acid diester)-poly(isophthalic acid diester) resins, and in particular to improved polyethylene terephthalate-polyethylene isophthalate resin formulations, the improved formulations containing nucleating and chain-branching agents. The improved formulations of the invention have particular utility in the manufacture of plastic bottles.

52 Claims, 11 Drawing Sheets

POLY(TEREPHTHALIC ACID DIESTER)-POLY(ISOPHTHALIC ACID DIESTER) RESIN FORMULATIONS HAVING IMPROVED GAS BARRIER PROPERTIES

This application is related to an application titled "Polyester Resins containing Silica and Having Reduced Stickiness", Application No. 09/185,494, which was filed concurrent with this application and whose teaching are incorporated herein.

FIELD OF THE INVENTION

The invention is directed to improved poly(terephthalic acid diester)-poly(isophthalic acid diester) resins, and in particular to improved polyethylene terephthalate-polyethylene isophthalate resin formulations, the improved formulations containing nucleating and chain-branching agents. The improved formulations of the invention have particular utility in the manufacture of plastic bottles.

BACKGROUND OF THE INVENTION

PET resin has its greatest use in the packaging industry and especially in the production of bottles for containing a wide variety of carbonated and non-carbonated fluids. One concern in using PET is the barrier properties of the polymer. In the carbonated beverage industry, bottlers are particularly concerned about the rate at which PET bottles allow carbon dioxide, $CO_2$, to escape from the container. If $CO_2$ escapes too rapidly, the beverage will go flat on the shelf before it can be sold and used by the consumer. Beverage producers/bottlers, and those who wrap other food products such as cookies, meat, candy and similar products in PET film, are also concerned with the ingress of oxygen from the atmosphere into the product container. While at the present time there are PET resins which can be used in the bottling and wrapping markets, further improvements are desirable.

Among the improvements which have been disclosed in recent years is the incorporation of varying amounts of polyethylene isophthalate into polyethylene terephthalate resins. The resulting PEI-PET resins have been found to have improved barrier properties, thus increasing the shelf life of many products, be it by preventing the escape of contained gases or the ingress of oxygen from the atmosphere.

Polyethylene terephthalate-polyethylene isophthalate (PEI-PET) resin formulations are well known and are described in numerous patents. For example, assigned to Amoco Corporation, Chicago, Ill., is U.S. Pat. Nos. 5,646,208 (a polyethylene terephthalate and polyethylene isophthalate composition); assigned to Mitsui Chemical Corporation is U.S. Pat. No. 5,556,675 [the use of 1,3-bis(2-hydroxyethoxy)benzene {HER} in combination with high levels of PIA]; assigned to Mitsui Petrochemical Industries, Ltd. is U.S. Pat. No. 5,039,780 [a copolyester derived of isophthalic acid, 2,6 napthalenedicarboxylic acid and a dihydroxy compound]; assigned to Mitsui Toatsu Chemicals, Inc. is U.S. Pat. No. 4,417,011 [a resin composition for bonding foundry sand having, among other things, (A) a dicarboxylic acid component of terephthalic acid, isophthalic acid or an alkyl isophthalate, (B) fumaric acid and (C) a glycol component]; assigned to Amoco Corporation is U.S. Pat. No. 5,028,462 [molded plastic bottles and method of producing same using a polyamide composition comprising, among other substances, isophthalic acid and terephthalic acid]; and assigned to Amoco Corporation is U.S. Pat. No. 5,646,208 [a melt composition comprising polyethylene terephthalate and polyethylene isophthalate]. The teachings of all cited patents cited herein are incorporated herein by reference.

While the use of PEI-PET resins is known and becoming increasingly more accepted, there are some inherent shortcomings when PET resins are modified with PIA, particularly with about 8% to about 20% PIA. For example, PEI-PET resins containing about 10% PIA have a very slow rate of thermal crystallization, which is a disadvantage in processing the resin through solid state polymerization (SSP). The slow crystallization rate requires a slower SSP production rate, thus decreasing overall plant output and increasing resin costs. While in some commercial instances the production rate of a 10% PEI-PET article is only 70% of that of PET (only) or 2.5% PEI-PET article, in other commercial instances the SSP crystallization equipment is incapable of processing a 10% PEI-PET resin at any production rate.

Another disadvantage of the 10% PEI-PET resins is that the slow rate of thermal crystallization arising from the use of PIA results in less crystallinity in the less stressed regions of articles such as bottles which may be formed using the resin. This lower crystallinity is particularly prevalent in the neck and base of the bottle, and affects the barrier properties of the bottle. Low crystallinity means that the resulting bottle has reduced barrier properties in the less stressed areas and that contained gases, for example, $CO_2$, will be able to more readily escape from such areas relative to other areas of the same bottle. Consequently, the full benefit of incorporating PIA into a PET resin is not realized.

Yet another disadvantage of 10% PEI-PET resin is that bottle preforms which use such resin have a significantly higher natural stretch ratio relative to conventional PET (only) and 2.5% PEI-PET packaging/bottle resins. The increased stretch ratio necessitates the use of special bottle preform molds which are shorter and narrower relative to conventional molds in order to accomplish the required stretching. Bottle preforms must be stretched to their natural stretch ratio in order to achieve the strain hardening required to give the bottles acceptable physical characteristics (burst pressure, creep strength and top load strength) as well as barrier performance. The necessity of using special preform molds for PEI-PET resins thus requires expensive retooling of the preform molds and does not permit the use of both PET resin and PEI-PET resin on the same line with the same molds.

Accordingly, it is the object of the present invention to provide novel PEI-PET formulations which overcome the disadvantages presently associated with PEI-PET resins.

It is a further object of the invention to provide PEI-PET resins containing a nucleating agent which accelerates the crystallization process to thereby facilitate faster SSP rates and reduce production costs.

Yet another object of the invention is to provide a PEI-PET resins containing a nucleating agent and a chain-branching agent, the latter being added to reduce the natural stretch ratio of PEI-PET resins to about the stretch ratio levels of commercially available PET resins.

SUMMARY OF THE INVENTION

The invention is directed to poly(terephthalic acid diester)-poly(isophthalic acid diester) resins, and particularly to polyethylene terephthalate-polyethylene isophthalate resins, having a nucleating agent and a chain-branching agent incorporated therein. The PEI-PET resin of the invention exhibits improved barrier properties relative to PET (only) and 2.5% PEI-PET resins. In addition, the PEI-PET resin of the invention overcomes the disadvantages presently associated with such resins by its having improved crystallinity characteristics, thereby enabling increased SSP production, reduced costs, and full use of the improved barrier properties which result from the addition of PIA to a PET resin.

The invention discloses a resin composition having about 1% to about 30% polyisophthalic acid diester, about 70% to about 99% polyterephthalic acid diester, about 250 to about 5000 ppm chain-branching agent (preferably about 250 to about 3000 ppm), and about 50 to about 5000 ppm nucleating agent. In particular, the invention discloses a resin having a polyisophthalic acid diester content of about 8% to about 20% and a polyterephthalic acid diester content of about 80% to about 92%. Examples of chain-branching agent(s) suitable for use in practicing the invention are:

(a) polyfunctional alcohols having three or more hydroxyl functional groups (b) pentaerythritol; and (c) polycarboxylates, and their acid precursors and anhydrides, for example, trimellitic anhydride, 2,3,5-napthalenetricarboxylic acid and similar substances. An example of a polyfunctional alcohol of the above formula is trimethylolpropane ethoxylate (ETMP, Aldrich, Milwaukee, Wis.); and includes similar alkane polyol substances [e.g., di(trimethylolpropane), DTMP, Aldrich], particularly branched alkane polyols (e.g., dipentaerythritol, Aldrich). The exact amount of chain-branching agent used will depend on the molecular weight and polyfunctionality of the agent. For example, about 500 ppm pentaerythritol has the same chain-branching effect as 1500–2000 ppm ETMP or an estimated 2000–4000 ppm DTMP.

The invention specifically discloses a resin composition having about 8% to about 20% polyethylene isophthalate, about 80% to about 92% polyethylene terephthalate, about 1200 to about 2000 ppm trimethylolpropane ethoxylate, and about 50 to about 2000 ppm nucleating agent selected from the group consisting of fumed silica, the sodium and potassium salts of a $C_{16}$–$C_{20}$ aliphatic monocarboxylic acid, benzoic acid, methylbenzoic acid, dimethylbenzoic acid and napthanoic acid; the resin composition being solid-stated to an intrinsic viscosity of about 0.85 to about 0.95.

The invention also discloses a process suitable for making a polyethylene terephthalate-polyethylene isophthalate resin composition useful for forming shaped articles, said process having the steps of:

(a) mixing about 1 to about 30 mole % isophthalic acid or diester and about 99 to about 70 mole % terephthalic acid or diester wherein the total acid component is 100 mole %, one or a plurality of diols sufficient to react on a total molar basis with said diacids, about 250 to about 5000 ppm chain-branching agent and about 50 to about 3000 ppm nucleating agent;

(b) adding to step (a), as may be required by the exact process being used, catalytic substances known to those skilled in the art, such substances generally being the oxide, acetate, halide, sulfate, oxalate and similar compounds of antimony, cobalt, manganese, titanium, zirconium and similar metals known to those skilled in the art as having utility for the production of polyester compounds;

(c) heating the mixture of (b) to a temperature of about 200 to about 250° C. for a time sufficient to form monomer between said diol and said acid components, where the application of reduced pressure may be applied to drive the reaction of this step toward completion and remove volatile substances from the vessel in which the reaction is being carried;

(d) heating the product of step (c) to a polycondensation temperature of about 260 to about 300° C., preferably from about 270 to about 290° C., to form a polymer containing isophthalate and terephthalate moieties having a chain branching agent and a nucleating agent; wherein said polycondensation reaction may be stabilized by the addition of a selected stabilizing agent; and (e) optionally, solid stating the polymer of step (d) to form a polyester having a desired intrinsic viscosity, said solid stating being performed at a temperature of about 180 to about 240° C.

In the processes for preparing polymer resins according to the invention, the nucleating agent(s) can be added any of the steps (a) through (d), though generally they are added at steps (a) or (d).

DETAILED DESCRIPTION OF THE INVENTION

Figure 1:
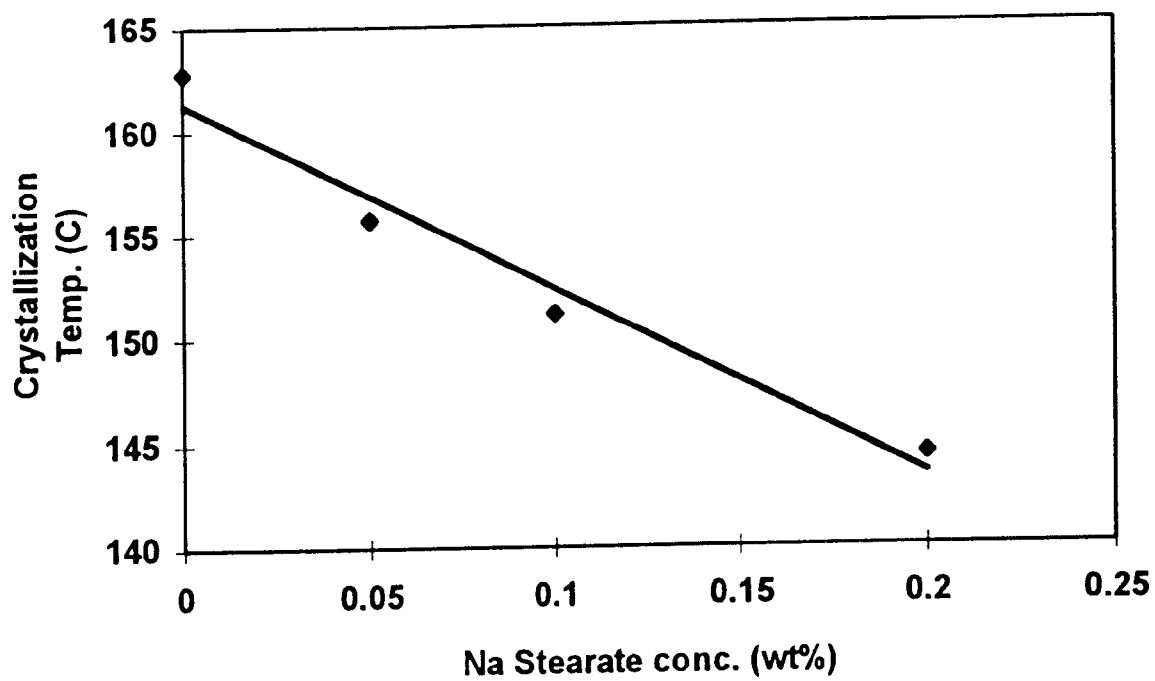
FIG. 1 illustrates the effect of a sodium stearate nucleating agent for reducing the cold crystallization temperature of a 10% PEI-PET resin.

All percentages used herein are mole % and parts-per-million (ppm) used herein are weight based, unless such terms are otherwise specified or understood from context. One thousand nanometers (1000 nm [$1\times10^{-9}$ meters]) equals one micron ($1\mu$[$1\times10^{-6}$ meters]).

The term "PET" as used herein means, in addition to the specific polyester "polyethylene terephthalate", any similar polyesters derived from the reaction of terephthalic acid with a glycol or glycol ether, or from the reaction of a non-polymeric terephthalic acid diester, for example, dimethyl terephthalate and similar diesters, with a glycol or glycol ether. Examples of such glycols and glycol ethers include cyclohexane dimethanol and diethers thereof, ethylene glycol and diethers thereof, diethylene glycol and diethers thereof, propylene glycol and diethers thereof, 1,3-propanediol and diethers thereof, butanediols and diethers thereof, pentanediols and diethers thereof, and similar compounds; where alkyl is a $CH_3(CH_2)_y$—moiety and y=0–5, or substituted alkyl where H is replaced by one or more similar alkyl groups. The term "PET" further includes a combination of PET and up to about 20 % of non-polyester polymers, for example, polyolefins, polyamides, polyamines and similar polymers known to those skilled in the art as capable of being combined with PET.

The term "PEI" (polyethylene isophthalate) includes, in addition to the polyester polyethylene isophthalate, similar polyesters derived from the reaction of isophthalate acid with a glycol or glycol ether, or from the reaction of a non-polymeric isophthalate acid diester, for example, dimethylisophthalate and similar diesters, with a glycol or glycol ether. Examples of such glycols and glycol ethers include cyclohexane dimethanol and diethers thereof, ethylene glycol (EG) and diethers, diethylene glycol (DEG) and diethers thereof, propylene glycol and diethers thereof, 1,3-propanediol and diethers thereof, butanediols and diethers thereof, pentanediols and diethers thereof, and similar compounds; where alkyl is a $CH_3(CH_2)_y$—moiety and y=0–5, or substituted alkyl where H is replaced by one or more similar alkyl groups. Thus, as used herein, the term "PEI" will include polymers formed from the reaction of isophthalic acid with any of the glycols or glycol ethers described herein, or similar substances known to those skilled in the art.

The term "PIA" means purified isophthalic acid as is commonly used and understood by those skilled in the art.

The terms "2.5% PIA-PET", "2.5% PEI-PET", "10% PIA-PET", "10% PIA-PET", and similar terms or variations thereof, mean a polymer resin of polyethylene isophthalate and polyethylene terephthalate, as these are defined herein, having a purified isophthalic acid content of 2.5%, 10% or other amount as specified. The percentages stated in the term is used to specify the nominal amount of PIA in a polymeric resin or used to prepare a polymeric resin containing PEI and PET. The variance of the nominal amount is ±20%.

The terms "polyisophthalic acid diester," "polyterephthalic acid diester," "polyterephthalate" and "polyisophthalate" mean a polymeric species in which terephtalate or isophthalate moieties, para- and meta-(—$OOCC_6H_4COO$—) respectively, are joined to a diol.

The invention comprises PEI-PET resins containing one or a plurality of nucleating agents, or the product of a reaction between functional groups within the resin and the nucleating agent and one or a plurality of chain-branching agents. The use of nucleating agent accelerates the rate of thermal (quiescent) crystallization. This gives such resins an advantage in solid state processing rates by allowing for an increased rate of production. As will be shown herein, the nucleating agents and the chain-branching agents used according to the invention can be added to the resins or resin mixture at various points in the process.

The PEI-PET resins used in practicing the invention comprise 70–99% PET and 1–30% PEI. The preferable resins are about 80% to about 95% PET and about 5% to about 20% PEI. The invention is particularly directed to a resin containing about 88% to about 92% PET and about 8% to about 12% PEI. Any process known to those skilled in the art may be used to prepare the PEI-PET resins used herein. For example, in broad terms, dimethyl terephthalate and dimethyl isophthalate can be mixed in a reaction vessel, and ethylene glycol, selected catalysts such as cobalt and manganese catalysts, chain-branching agent(s) and nucleating agent(s) added in appropriate quantities. The contents of the vessel are then reacted for a selected time(s) at selected temperature(s) and pressure(s) to yield, after incorporation of a selected stabilizing/ sequestering agent, a product comprising PEI-PET resin having a chain-branching agent and a nucleating agent, or reaction product thereof, therein.

Although the invention may be applied to any method of preparing PEI-PET resins having nucleating agents and chain-branching agents as taught herein, the following examples are given to illustrate some of the preferred embodiments which have greater commercial significance, and not intended to limit the scope of the invention.

I. General description.

Suitable polyesters are produced from the reaction of a diacid or diester component comprising at least 65 mole % terephthalic acid or $C_1$–$C_4$ dialkyl terephthalate, preferably at least 70 mole %, more preferably at least 75 mole %, even more preferable at least 95 mole %, and a glycol/diol component comprising at least 65 mole % diol, preferably at least 70 mole %, more preferably 75 mole %, even more preferably 95 mole %. It is also preferable that the diacid component is terephthalic acid and the diol component is ethylene glycol. The mole percentage for all of the diacid component totals 100 mole %, and the mole percentage for all of the diol component totals 100 mole %.

Where the polyester components are modified by one or more diol components other than ethylene glycol, suitable diol components of the described polyesters may be selected from the diols listed else where herein, which diols include, for example, 1,2-propanediol; 1,3-propanediol; 1,4-butanediol; 2,2-dimethyl-1,3-propanediol; 1,6-hexanediol; 1,2-cyclohexanediol; 1,4-cyclohexanediol; 1,2-cyclohexanedimethanol; 1,3-cyclohexanedimethanol; z,8-bis(hydroxymethyl)-tricyclo-[5.2.1.0]-decane wherein z represents 3, 4 or 5; and diols containing one or more oxygen atoms in the chain, for example, diethylene glycol, triethylene glycol, dipropylene glycol and similar glycols, and mixtures of all of the foregoing. In general, the diols contain 2–18, preferably 2 to 8, carbon atoms. Cycloaliphatic diols can be employed in their cis- or trans- forms, of as mixtures of both forms. Preferred modifying diol components are 1,4-cyclohexanedimethanol or diethylene glycol, or mixtures of thereof.

Where the polyester components are modified by one or more acid components other than terephthalic acid, the suitable acid components (aliphatic, alicyclic or aromatic dicarboxylic acids) of the linear polyester may be, for example, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-napthalenedicarboxylic acid, bibenzoic acid, and similar diacids, or mixtures thereof In polymer preparation it is often preferred to use a functional derivative of the diacid, for example, the dimethyl, diethyl, dipropyl and similar diester of the dicarboxylic acid. The anhydrides and acid halides of these diacids may also be used where practical.

Also particularly contemplated by the present invention is a modified polyester made by reacting at least 85 mole % terephthalate from either terephthalic acid or dimethyl terephthalate with any of the above co-monomers.

The polyesters of the present invention can be produced by any of the conventional methods of producing polyethylene terephthalate. Conventional methods of producing polyethylene terephthalate are well known and comprise reacting terephthalic acid with ethylene glycol at a temperature of about 200 to about 250° C. forming monomer and water. Because the reaction is reversible, the water is continuously removed, driving the reaction to the production of monomer. Next, the monomer undergoes a polycondensation reaction to form the polymer. During the reaction of the terephthalic acid and ethylene glycol it is not necessary to have catalyst present. Generally, during the polycondensation reaction, a catalyst is preferably present, for example, an antimony catalyst or other catalyst known in the art. When diester are used in preparation of the polymer, other diacids and other diols may conventionally employed various catalysts as is well known in the art. The chain-branching agent(s) and nucleating agent(s) according to the invention can be added as taught elsewhere herein.

II. In one preferred embodiment:

Terephthalic acid or a terephthalic acid diester (for example, dimethyl terephthalate, diethyl terephthalate and similar substances) is mixed with isophthalic acid or an isophthalic acid diester (for example, dimethyl isophthalate, diethyl isophthalate and similar substances), glycol or diol, chain-branching agent(s), nucleating agent(s) and selected catalysts, and reacted for a selected time at a selected temperature and pressure to yield, after incorporation of a stabilizing agent and further reaction, a product comprising PEI-PET resin having a chain-branching agent and nucleating agent, or reaction product thereof, therein. The product of this reaction is a random copolyester.

III. In another preferred embodiment:
(1) a PET made by reaction of terephthalic acid or a terephthalic acid non-polymeric diester (for example, dimethyl terephthalate) in the presence of selected catalyst(s), a nucleating agent(s) and a chain-branching agent(s), and
(2) a PEI made by reaction of isophthalic acid or an isophthalic acid non-polymeric diester (for example, dimethyl isophthalate) in the presence of selected catalyst(s), a nucleating agent(s) and a chain-branching agent(s), are mixed or blended together for a selected time at a selected temperature to yield a product comprising a PEI-PET resin having, among other things, a chain-branching agent and a nucleating agent incorporated therein. The blending or mixing of the two polymers may be done by any method known to those skilled in the art, for example, in a vessel, an extruder or a resin kettle, Such blending or mixing may be for a time in the range of about one (1) minute to about two (2) hours depending on the method of mixing or blending. For example, about 1 to about 5 minutes in an extruder or about 1 to about 2 hours in a resin kettle or similar vessel. The temperature of the blending or mixing is at or above the melt temperature of the polymers. For example, using polyethylene isophthalate itself as one of the polymer resins, the blending or mixing temperature may be from about 260° C. to about 300° C., preferably from about 270° C. to about 290° C.

IV. In an additional embodiment:

In addition to blending "pure homopolymers", for example, polyethylene terephthalate itself and polyethylene isophthalate itself as in II above, one can also blend mixtures. For example, one can also blend (a) a PET polymer with (b) a 90% PEI-10% PET polymer resin to form a 10% PEI-PET resin. Blending conditions are similar to those in II above. Chain-branching agent(s) and mucleating agent(s) are added as taught in II and elsewhere herein.

In any and all embodiments of the invention, resin containing nucleating and/or chain-branching agents is solid-stated to have an intrinsic viscosity (IV) of about 0.7 to about 1.2, preferably about 0.8 to about 1.1, and further preferably from about 0.85 to about 1.0. IV is determined as described herein.

The stabilizing agents used in practicing the invention are phosphorus-containing stabilizing agents, for example, phosphoric acid and phosphates, phosphonic acids and esters thereof, polyphosphoric acids and salts of esters thereof, and similar phosphorus compounds known to those skilled in the art as useful as stabilizing agents or catalyst sequestering agents. Other substances known to those skilled in the art as being useful as stabilizing agents or catalyst sequestering agents may also be used in practicing the invention provided that they do not impart color to the resin or promote degradation of the polymers or chain-branching agents comprising the invention.

Various types of nucleating agents for polymers are known in the art. These include metal powders such as zinc and aluminum; metal oxides such as the oxides of zinc, magnesium, titanium and silicon; clays which are combination of a wide variety of metal oxides, mixed metal oxides and hydrated variations thereof; inorganic salts such as sodium carbonate and the carbonates, silicates and phosphates of calcium; polymers such as polytetrafluoroethylene powder (PTFE); organic compounds such as sorbitol; and organic salts, for example, the sodium salts of carboxylic acids such as benzoic acid, tartaric acid and stearic acid.

While there are a variety of substances which can be used as nucleating agents, the choice of agent for use with PET and PEI-PET resins is somewhat restricted. Sorbitol could not be used because, while it is an excellent nucleating agent for some polymers such as polypropylene, it reacts with PET and would lose its nucleating effects. Metals and many metal salts, particularly those of the transition metals, cannot be used with PET because they catalytically promote the thermal degradation of PET and would lose their nucleating effect. Lastly, nucleating agents should not cause haziness, which means that they must be of small particle size or, if large sized particles are used, they must be used in low concentrations. Bearing in mind these and other considerations known to those skilled in the art concerning nucleating agents, for example, imparting color, the present invention teaches the use of various homogeneous and heterogeneous agents, for example, silica, clay, fumed silicas and organic carboxylic acid salts. Preferred "homogeneous" nucleating agents include, for example, sodium benzoate and sodium stearate, or similar potassium salts. Some preferred heterogeneous nucleating agents are silicas, including fumed silica (also referred to precipitated silica), clays, colloidal silica and silica beads. The particle size of these preferred heterogeneous nucleating agents is from about 0.1 to about 25 microns, preferably from about 0.1 to about 5 microns, and most preferably from about 0.1 to about 3 microns.

In view of the above considerations, it was surprising that sodium stearate and sodium benzoate proved an effective nucleating agent which did not impart color to PEI-PET resins, and did not cause haziness. In fact, until taught to the contrary herein, sodium benzoate and similar carboxylic acid salts were not deemed acceptable because they could impart a brown color to the PET resins, making the resins unsuitable for many applications, for example, use in clear, colorless bottles.

Nucleating agents particularly useful in practicing the invention are nucleating agents which are believed to react with the PET chain (herein "homogeneous" nucleating agents). Examples include the alkali and alkaline-earth metal salts of $C_8$–$C_{20}$ aliphatic and $C_7$–$C_{10}$ aromatic monocarboxylic acids such as caprylic, capric, lauric, myristic, palmitic, stearic, linoleic, benzoic, toluic, napthanoic, and similar acids. The preferred aliphatic acids are $C_{14}$–$C_{20}$. The preferred metals are sodium and potassium. Nucleating agents may be used in amounts of about 50 ppm to about 5000 ppm preferably from about 50 ppm to about 3000 ppm, most preferably from about 50 to about 2000 ppm. The nucleating agent(s) described in this paragraph may have a particle size of about 1 micron to about 500 microns, and preferably of about 50 to about 250 microns. The range of particles size useful in practicing the invention is broad because the particles may react with polyester as. Consequently, larger particles can easily be used in practicing the invention. Food grade nucleating agents are preferred for products used in food containers.

The sodium stearate (NAS) used in the Examples herein is a Food and Drug Administration (FDA) food grade material and has a particle size of about 90 to about 110 microns ($\mu$). NAS having a particle size in the range of about 1 micron to about 500 microns is useful in practicing the invention, the preferred particle size being about 50 to about 250 microns. The NAS is added in an amount of from about 50 to about 5000 ppm (parts per million), 0.005–0.5 %, based on the weight of resin used, the preferred amount being from about 50 to about 2000 ppm (about 0.01% to about 0.01–0.2% by weight). The exact amount of NAS used in practicing the invention is a function of the particle size, the clarity (no haze) required, the rate of crystallization desired, the amount of PIA used and other factors.

Silicas, and in particular fumed silica, was also found to have the desired nucleating effect. If the resin is intended for food use, the silicas are FDA approved. The fumed silica used herein was used at a level of about 50 ppm to about 500 ppm.

A chain-branching agent is added to PEI-PET resins in order to reduce the natural stretch ratio of the resin to a level approximately equivalent to that of a PET (only) or 2.5% PEI-PET resin. Examples of chain-branching agent(s) suitable for use in practicing the invention are:

(a) polyfunctional alcohols having three or more hydroxyl functional groups (b) pentaerythritol; and (c) polycarboxylates, and their acid precursors and anhydrides, for example, trimellitic anhydride, 2,3,5-napthalenetricarboxylic acid and similar substances.

One preferred chain-branching agent is trimethylolpropane ethoxylate (ETMP, Aldrich, Milwaukee, Wis., Catalog No. 40,977-4), and similar alkane polyols [e.g., di(trimethylolpropane), DTMP, Aldrich, and derivatives thereof], particularly branched polyols (e.g., dipentaerythritol, Aldrich).

ETMP, and similar substances, can be added in an amount of from about 250 ppm to about 5000 ppm, preferably about 250 ppm to about 3000 ppm. The exact amount is somewhat dependent on the amount of PIA contained in the PEI-PET resin, increasing as the amount of PIA increases. For PEI-PET resins containing about 10% PIA, a preferred amount of ETMP is about 1000 to about 2500 ppm, usually about 1500 ppm as in the examples herein. In the examples herein, it was noted that when 1500 ppm ETMP was added to the PEI-PET resin containing 10% PIA, the burst pressure, and the creep and top load strength of the resulting bottles was equivalent to the control (2.5% PIA, no chain-branching agent, no nucleating agent), and the $CO_2$ barrier properties showed a 23% increase. The bottles were prepared using the same preform molds used to prepare PET (only) and 2.5% PEI-PET bottles. The 10% PEI-PET resin of the invention did not require the use a special mold as is required by 10% PEI-PET resin compositions previously known in the art. The chain-branching agent was found to accelerate both melt and solid state polymerization rates, which acceleration will in turn reduce manufacturing costs.

The dimethyl terephthalate (DMT, used to prepare PET by transesterification) and PEI/PIA substances used to prepare PET (only) or PEI-PET resins, are commercially available or can be prepared from commercially available materials by methods known to those skilled in the art. PIA is available from Amoco Corporation, Chicago, Ill. PET is available from HNA Holdings, Inc., Trevira Polymer Group, Spartanburg, S.C.

The esterification/transesterification catalysts were used in the Examples herein were cobalt (Co), antimony (Sb) and manganese (Mn) in the form of the acetates, although other salts such as the chlorides, bromides, oxides and sulfates can also be used. The weight of catalyst(s) given herein refers to the weight of metal, regardless of compound used to supply the metal. Other metals and metal combinations known to those skilled in the art as being useful in esterification/transesterification reactions can also be used. The amount of catalyst(s) used in esterification/transesterification reaction is well known in the art.

The esterification/transesterification reactions herein were quenched by the addition of a sequestering agent, a phosphorus compound selected from the group consisting of phosphoric acid, polyphosphoric acid, and similar phosphorus acids, and alkali and alkaline-earth phosphates, phosphonates, polyphosphates, and similar phosphorus-containing substances known to those skilled in the art. Other sequestering agents known to those skilled in the art can also be used.

Generally, the amount of catalyst or catalyst mixture, and sequestering/quenching agent, employed in practicing the invention is that used in conventional systems and is well known in the art. The amount of phosphorus-containing compounds will vary depending on the amount of esterification/transesterification catalyst as is also well known in the art. Phosphorus compounds may also be added to polyester resins as stabilizing agents as is well known to those skilled in the art.

Test Methods

Intrinsic viscosity (IV) was determined by mixing 0.2 grams of the amorphous polymer composition with 20 milliliters of solvent consisting of dichoroacetic acid at a temperature of 25° C. and using a Ubbelhode viscometer to determine the relative viscosity (RV). RV is converted to IV using the ISO certified equation:

$$IV=[(RV-1)\times0.6907]+0.063096$$

The haze of the amorphous polymer composition was determined by visual observation.

Brightness and yellowness of the amorphous polymer composition were determined by using a digital color monitor such as Hunter Lab Scan 6000. Usually the range of acceptable brightness (L* value) is 55–65. The lower the number the grayer the polymer. For yellowness (B* value), a negative number indicates more blueness and a positive number indicates more yellowness. Preferably, the yellowness number is between −3 to −8 (not yellow, but not too blue).

Analysis of the DEG (diethylene glycol) content in the amorphous polymer resin was also performed. An appropriate portion of the amorphous polymer was hydrolyzed with an aqueous solution of ammonium hydroxide in a sealed reaction vessel at 220±5° C. for approximately two hours. The liquid portion of the hydrolyzed product was then analyzed by gas chromatography. The gas chromatography apparatus was a FID Detector (HP5890, HP7673A) from Hewlett Packard. The ammonium hydroxide was 28 to 30% by weight ammonia from Fisher Scientific and was reagent grade.

The CEG (carboxyl end groups) value of the amorphous polymer was determined by dissolving a sample of the amorphous polymer in reagent grade benzyl alcohol and titrating to the purple end point of Phenol Red indicator with 0.03N sodium hydroxide/benzyl alcohol solution. The results are reported as milli-equivalents sodium hydroxide per kilogram of the sample.

The amount of catalysts and the sequestering agent in the amorphous polymer was determined using a Model Spectrascan III High Voltage DC Plasma Emission Spectrograph (Spectrometric Inc., Andover, Mass.). A sample of the amorphous polymer was placed in a cassette, the cassette introduced into the spectrograph, and the base line and the slope of each catalyst and sequestering agent present determined.

The catalysts employed in the Examples are antimony, manganese and cobalt, and the sequestering agent is phosphorous.

The glass transition temperature ($T_g$) and melt temperature ($T_m$) were also determined. A differential scanning calorimeter (DSC) was used to determine the temperature at the transition temperatures. The rate of temperature increase/decrease was 10° C. per minute. The DSC instrument was a Model 910 DSC from Perkin-Elmer. The DSC was purged with nitrogen at a rate of 50 ml per minute. The peak of the crystallization exotherm during heating is $T_{cc}$, the cold crystallization temperature. All DSC data is the average of two runs. The isothermal rate of crystallization is determined by heating to 295° C., rapidly cooling to 190° C. and holding the temperature for crystallization.

The percent isophthalic acid present in the amorphous polymer was determined at 285 nanometers using a Hewlett Packard Liquid Chromatograph (HPLC) with an ultraviolet detector. An amorphous polymer sample was hydrolyzed in diluted sulfuric acid (10 ml acid in 1 liter deionized water) in a stainless steel bomb at 230° C. for 3 hours. After cooling, an aqueous solution from the bomb was mixed with three volumes of methanol (HPLC grade) and an internal standard solution. The mixed solution was introduced into the HPLC for analysis.

The following examples are given to illustrate the present invention, and it shall be understood that these examples are for the purposes of illustration and are not intended to limit the scope of the invention.

Bottle Testing Methods

1. Burst Strength

Twelve bottles comprise a set. A set of bottles is first filled with water and then additional water is pumped into the bottles at a programmed rate. The pressure at which the container bursts and the volume expansion during pressurization are recorded. The test is performed on an AGR Plastic Pressure Tester. The manufacturer's stated accuracy is +/− 3 psi.

2. Thermal Stability

The thermal stability test is designed to perform accelerated testing on a set of sample containers to assess potential field performance. A set of twelve containers is dimensionally measured and then nominally carbonated to standard fill point. These bottles are equilibrated under standard conditions for 24 hours and then placed into a 100° F., 90% RH environment for 24 hours. The containers are then measured again to establish the dimensional changes that have occurred in the container. Bottles must meet rigorous specifications for percent diameter change, base roll out, and fill point drop characteristics as determined by the end user.

The error in measurement for the height and diameter measurements is estimated to be less than 0.010" or roughly 0.1%–0.3% of the measured value, depending upon the height and diameter of the bottle.

3. TopLoad

The top load test is performed on a set of twelve samples to test the empty container's resistance to vertical load. This test is generally performed utilizing an Instron Model 4411 in compression mode. The crosshead of the Instron compresses the bottle and a load cell contained in the crosshead measures the amount of force required to deflect the bottle. The test is performed to a deflection of 0.250"and at a specified crosshead speed. The accuracy of the load cell on the Instron as specified by the vendor is less than 1% of full scale, where full scale is 1000 lbf 4. Sidewall Density Small samples are punched from the sidewalls of containers. These samples are introduced into a density gradient column which is built to span the range of density from that of amorphous PET to that of 100% crystalline PET. (The density of amorphous PET is 1.335 $g/cm^3$, while that of 100% crystalline PET has been determined by x-ray diffraction to be 1.455 $g/cm^3$). The density gradient column is calibrated by the use of hollow glass spheres which have a range of densities and which are guaranteed accurate to 0.0002 $g/cm^3$ as determined by a method traceable to NIST.

In the test, the sample sinks until it reaches the point at which it attains neutral buoyancy, i.e. the point at which it is of the same density as the surrounding medium. The height which the sample achieves in the density gradient column is compared to the heights of the glass calibrants. This height is then used to obtain the density values of the samples which are then correlated to crystallinity using a density/crystallinity graph based on the above density relationships. A linear function is employed to estimate the crystallinity of samples between the two extremes.

The linearity of a density gradient column varies with usage, but in all cases a minimum least squares fit of r=0.995 is assured.

5. FTIR $CO_2$ Loss

For a description of the test method, see U.S. Pat. No. 5,473,161.

The containers must meet the current time specifications for 17.5% carbonation loss. FTIR shelf life data reported is at a 95% confidence level.

Example A. First Laboratory Preparation of PEI-PET Resins containing NAS

A series of batches of PEI-PET polymer with different levels of NAS nucleant were prepared using a laboratory glass autoclave. All the PEI-PET resin preparations used about 600 g DMT, about 450 g ethylene glycol, about 82 ppm Mn, about 250 ppm Sb, about 45 ppm Co, about 1.4 wt % DEG (based on weight DMT) and about 61 ppm P. The PIA content was based on DMT. The low PIA content samples, including the low PIA control, contained a nominal 2.5 % PIA; and the high PIA content samples, including the high PIA control, contained a nominal 10% PIA. Control samples contained no NAS. Other samples contain 500, 1000, and 2000 ppm NAS as indicated. After preparation, the resins were measured for IV, CEG, DEG content, color, Co, Mn, Sb, P, brightness (B*), and yellowness (L*). The results are summarized in Tables I and 2. Polycondensation temperature (PC) was about 260 to about 300° C.

The analytical results of Table 2 indicate that there is good PIA retention, the levels being from about 88% to about 96%.

TABLE 1

Laboratory Preparation of PEI-PET Resins Containing NAS.

| Sample | Description | PC Time (min.) | IV (dl/g) | Molten Polymer | L* | BL* |
|---|---|---|---|---|---|---|
| A1 | 2.5% PIA, Control | 100 | 0.710 | Clear | 62.5 | −7.0 |
| A2 | 2.5% PIA + 500 ppm NAS | 120 | 0.522 | Almost Clear | 67.9 | −6.1 |
| A3 | 2.5% PIA + 1000 ppm NAS | 120 | 0.691 | Dull | 60.4 | −1.4 |
| A4 | 10% PIA, Control | 125 | 0.583 | Clear | 67.4 | −4.3 |
| A5 | 10% PIA + 500 ppm NAS | 100 | 0.537 | Almost Clear | 65.9 | −1.3 |
| A6 | 10% PIA + 1000 ppm NAS | 120 | 0.650 | Dull | 56.1 | −12.8 |
| A7 | 10% PIA + 2000 ppm NAS | 145 | 0.540 | Opaque | 63.4 | −11.5 |

L* = Brightness.    B* = Yellowness

TABLE 2

Chemical Analysis - Example 1, Samples A1–A7

| Sample | Description | wt % PIA | wt % DEG | CEG |
|---|---|---|---|---|
| A1 | 2.5% PIA Control | 2.45 | 1.31 | 15 |
| A2 | 2.5% PIA + 500 ppm NAS | 2.34 | 1.22 | 11 |
| A3 | 2.5% PIA + 1000 ppm NAS | 2.40 | 1.25 | 23 |
| A4 | 10% PIA Control | 9.04 | 1.32 | 15 |
| A5 | 10% PIA + 500 ppm NAS | 8.79 | 1.15 | 15 |
| A6 | 10% PIA + 1000 NAS | 9.85 | 1.28 | 20 |
| A7 | 10% PIA + 2000 NAS | 9.97 | 1.03 | 14 |

Samples A1–A7 were analyzed by differential scanning calorimetry (DSC) to determine the effect of the nucleating agent on polymer crystallization process. Polymer crystallization process proceeds in two steps. The first step is nucleation, the formation of nuclei. The second step is crystal growth from the nuclei. The addition of nucleating particles serves to promote nucleation and thus increase both the overall crystallization rate and increase the degree of crystallinity in a fixed time. The effect of the nucleating agents on polymer crystallization can be detected by DSC. The decrease in the cold crystallization temperature, i.e., crystallizing from the glassy state upon heating, occurs during the resin SSP process. If a nucleating agent is added to PET (only) or PET containing about 2–3% PIA, the preform and the bottle will haze because the crystallization rate is too fast due to the presence of the nucleating agent. However, at about 10% PIA, a PEI-PET resin will crystallize more slowly than PET alone or PET with 2–3% PIA. Consequently, the presence of an appropriate amount of nucleating agent is not likely to cause haziness.

TABLE 3

DSC Thermal Analysis Results.

| Sample | Description | $T_g$ (° C.) (Heating) | $T_{cc}$ (° C.) | $T_m$ (° C.) |
|---|---|---|---|---|
| A1 | 2.5% PIA Control | 79 | 151 | 246 |
| A2 | 2.5% PIA + 500 NAS | 79 | 149 | 249 |
| A3 | 2.5% PIA + 1000 ppm NAS | 80 | 136 | 246 |
| A4 | 10% PIA Control | 77 | 163 | 227 |
| A5 | 10% PIA + 500 ppm NAS | 77 | 156 | 231 |
| A6 | 10% PIA + 1000 NAS | 77 | 151 | 226 |
| A7 | 10% PIA + 2000 ppm NAS | 76 | 144 | 227 |

The effect of sodium stearate (NAS) on decreasing the cold crystallization temperature ($T_{cc}$) is illustrated in FIG. 1, The higher cold crystallization temperature of the 10% PIA control sample (163° C.) relative to that of the 2.5% PIA sample (151° C.) means that the 10% PIA sample has to be heated to a higher temperature from the glassy state in order for crystallization to occur. This is consistent with the fact that a 10% PIA resin is harder to crystallize than the 2.5% PIA resin. The addition of NAS decreased the cold crystallization temperature of the 10% resin as is illustrated in FIG. 1. A good linear relationship was found between the amount of NAS in the resin and the decrease in cold crystallization temperature.

Sample A6, which contains 1000 ppm NAS and 10% PIA, had about the same cold crystallization temperature as the 2.5% PIA control sample. This indicates that in a bottle blow molding process the 10% PIA sample with 1000 ppm NAS should exhibit about the same cold crystallization characteristics as the 2.5% PIA control sample.

The samples containing 2.5% PIA exhibits effects similar to those discussed above for the 10% PIA samples. NAS reduced the cold crystallization temperature. The results with the 2.5% PIA samples thus verify the nucleating properties of NAS. However, at a low 2.5% PIA level, haziness occurs because the PEI-PET mixture crystallized too rapidly. It should be recalled that PIA crystallized more slowly than PET. Consequently, at any level of NAS, the less PIA present in a PEI-PET resin mixture, the faster the mixture will crystallize. Example B. Resin and Bottle Physical Property Experiments.

Prior experimentation has indicated that the inclusion of PIA into a PET bottle resin formulation may adversely affect bottle physical properties. For example, burst pressure is expected to decrease, creep is expected to increase and top load crush pressure is expected to decrease. In order to improve these properties, ethoxylated trimethylolpropane (ETMP), a chain-branching agent, was added to PET resin formulations containing 10% PIA. In addition, a nucleating agent was added to selected PEI-PET resin batches. In Example B, the selected nucleating agent was fumed silica (Cab—O—Sil™, Cabot Corporation, Billingsly Mass.) NAS may also be used as nucleating agent.

Overall, the results of the tests conducted in Example B indicate that the use of about 1500 ppm ETMP in a 10% PEI-PET resin and solid-stating the resin to an IV of about 0.90 resulted in a 10% PEI-PET resin with creep, top load and burst properties similar to the 2.5% PEI-PET control resin. Further, the results indicate that adding about 1500 ppm ETMP and solid-stating the resin to 0.90 IV results in a "drop-in" resin which can be substituted for PET resins now in use without the necessity for expensive retooling (mold replacement) in order to account for the high natural stretch ratio found in 10% PEI-PET resins.

Five 225 kg batches of PEI-containing resins containing various levels of PIA, ETMP, and fumed silica nucleating agent were prepared in pilot plant facilities at temperatures of about 260 to about 300° C. These batches were split and solid-stated to two different IVs. The bottle molding properties of the various batches were then investigated. The ETMP was added with the ester interchange catalysts (antimony, manganese, and cobalt) during the resin production process. Catalyst(s), sequestering agent (P) and other substances added to resin mixtures are: 65 ppm Co, 250 ppm Sb, 82 ppm Mn, 69.7 ppm P.

TABLE 4

Resin formulations[1]

| Sample | % PIA-Target | PIA-Actual | Fumed Silica | ppm ETMP-Target | IV-Actual |
|---|---|---|---|---|---|
| B1L | 2.5 | 2.34 | 0 | 0 | 0.848 |
| B1H | 2.5 | 2.34 | 0 | 0 | 0.883 |
| B2L | 2.5 | 2.32 | 0 | 660 | 0.837 |
| B2H | 2.5 | 2.32 | 0 | 660 | 0.895 |
| B3L | 10 | NA | 0 | 0 | 0.839 |
| B3H | 10 | NA | 0 | 0 | 0.901 |
| B4L | 10 | 8.29 | 0 | 1500 | 0.836 |
| B4H | 10 | 8.29 | 0 | 1500 | 0.915 |
| B5L | 10 | 8.34 | 250 ppm | 1500 | 0.839 |
| B5H | 10 | 8.34 | 250 ppm | 1500 | 0.893 |

Note:
"L" stands for low Actual IV and "H" stands for high Actual IV.

TABLE 5

DSC Analysis of 10% PEI-PET Resin Containing Fumed Silica

| Resin | $T_g$ (° C.) | $T_{cc}$ (° C.) | $T_m$ (° C.) |
|---|---|---|---|
| B3H | 78 | 179 | 228 |
| B4H | 78 | 179 | 229 |
| B5H (silica) | 78 | 174 | 230 |

The resins described in Table 4 were tested through various procedures in order to obtain information concerning the utility of the resins for bottle manufacture. The natural stretch ratios of the resins were determined in a "free-blow" study in which free-blow balloons of resin are made without the use of a bottle mold. The balloons are made at various temperatures and pressures, and the changes in the axial and radial diameters of a circle drawn on the outside of the preform at each temperature and pressure was measured. A resin that exhibits a "high" natural stretch ratio needs to stretch further before strain hardening can occur. Consequently, in any process using preform molds and relative to a resin with a "low" natural stretch ratio, smaller preform molds need to be used for high natural stretch resins in order to accommodate the stretching properties of such resins and allow the bottles blown from such resins to attain acceptable physical property characteristics. If large preform molds were used to form bottle preforms from resins with high natural stretch ratios, the preforms would not stretch sufficiently and the bottle would not achieve strain hardening during the final bottle blowing process. Consequently, the physical characteristics of the final product, for example, the crystallinity, would not reach the desired level and bottle performance would be unacceptable.

The data in Table 5 demonstrates the nucleating effect of fumed silica. The presence of fumed silica lowered the $T_{cc}$ of the B5H resin by about 5° C. due to the nucleating effect of the fumed silica. The DSC data also indicates that the presence of ETMP in B4H versus no ETMP in B3H does not effect the crystallization behavior of 10% PIA resins.

PEI-PET resins containing 10% PIA exhibit higher natural stretch ratios because of the lower tendency of PEI for orientation compared to PET homopolymers. However, when a chain-branching agent such as ETMP is incorporated into the resin formulation and the resin is processed to a higher IV (higher molecular weight), more intermolecular chain entanglements will be introduced into the resin and stress-induced orientation and crystallization during the blow-molding process will be promoted. As a result, the final product, the bottle which will be filled and sold to the consumer, will have robust physical characteristics.

Figure 2:
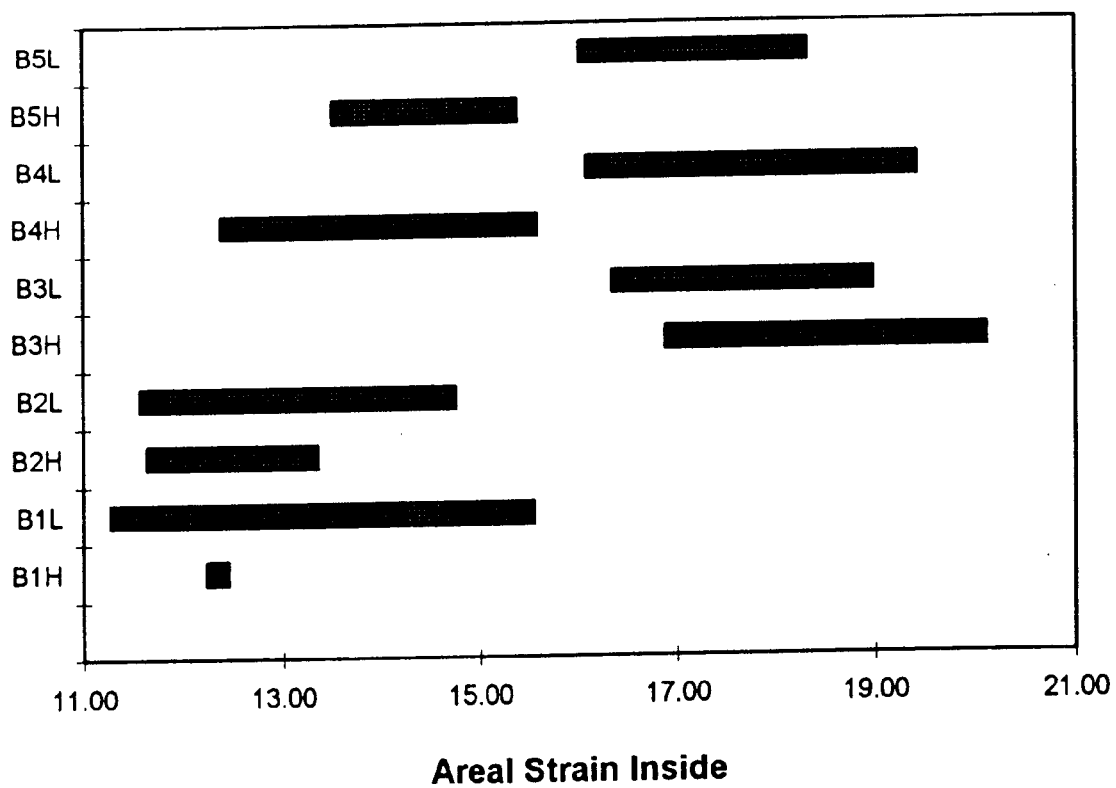
FIG. 2 illustrates the natural stretch ratio of the series of PEI-PET resins of Example B, the bar widths denoting 95% confidence intervals.

FIG. 2 illustrates the natural stretch ratios of the series of 10% PEI-PET resins of Example B. FIG. 2 indicates that the addition of 1500 ppm ETMP to 10% PEI-PET resins and solid-stating the resins to 0.90 IV (the B4H and B5H resins) results in resins with "normal" natural stretch ratios similar to the 2.5% PEI-PET resins in the lower left quadrant. As a consequence of this "normal" natural stretch ratio, the B4H and B5H resins demonstrate bottle physical properties similar to those of the 2.5% PEI-PET resins. The significance of this data is that the B4H and B5H resins can act as "drop-in" resins, being used to replace 2.5% PEI-PET or 100% PET resins which are currently being used in bottle manufacture without requiring retooling and the introduction of smaller preform molds. The widths of the bars denote the 95% confidence intervals of the data.

Figure 3:
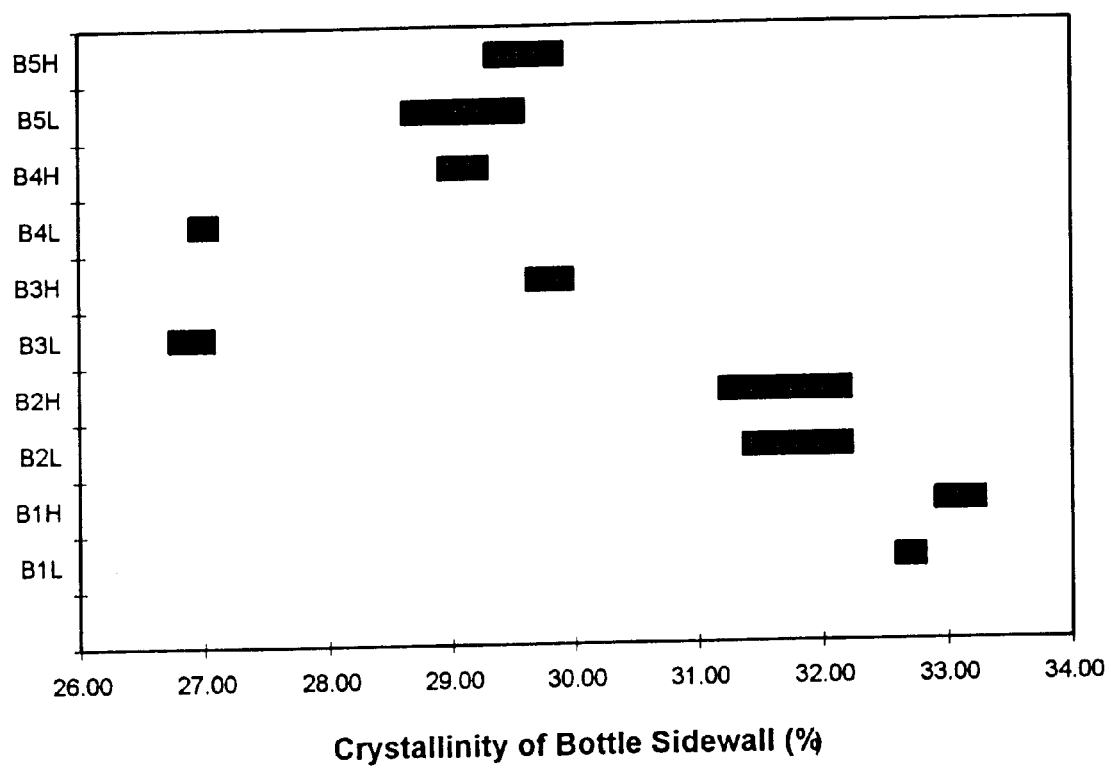
FIG. 3 illustrates bottle wall crystallinity data for the series of PEI-PET resins of Example B, the bar widths denoting 95% confidence intervals.

FIG. 3 illustrates bottle wall crystallinity data for the resins of Example B. All other factors being held constant, increasing the percentage of PIA in a resin will generally decrease the crystallinity of the bottle sidewall. However, as the data present herein indicates, the addition of a nucleating agent, solid-stating to higher IVs, and adding chain-branching agents results in bottles with increased sidewall crystallinity at the higher PIA levels. For example, bottles blown from 10% PEI-PET resins solid stated to an IV of 0.90 (B3H and B4H) exhibited higher sidewall crystallinity levels than bottles blown from the same 10% PEI-PET resins solid-stated to an IV of 0.84 (133L and B4L). These results are consistent with the theory that higher molecular weight (higher IV) resins contain more molecular entanglements which results in increased stress-induced crystallization during the blow-molding process. The higher sidewall crystallinity of the B5L bottles compared to the B3L and B4L bottles is believed to be a result of the nucleating effect of the Cab—O—Sil.

Figure 4:
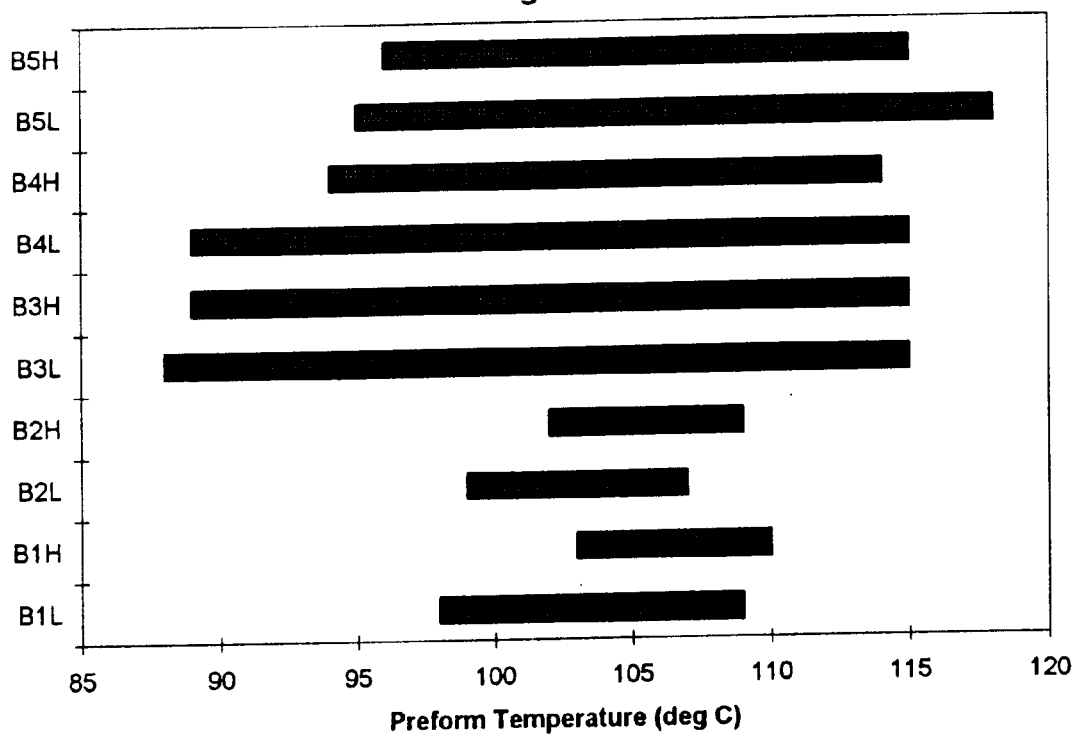
FIG. 4 illustrates bottle blow-molding window data for the series of PEI-PET resins of Example B.

FIG. 4 illustrates the blow-molding window for the resins of Example B. The widths of the blow-molding windows for the 10% PEI-PET resins is wider than the widths of the blow-molding windows for the 2.5% PEI-PET resins. Because 10% PEI-PET resins crystallize more slowly than 2.5% PEI-PET resins, bottles prepared from the former do not exhibit haze on the hot end of the blow molding window as often occurs with the 2.5% PEI-PET resins. However, since bottlers prefer to process bottles at the cold end of the blow-molding window to achieve maximum production rate and/or reduce energy costs, the preform temperature at the cold end of the window is more important. The data illustrated in FIG. 4 indicates that for the 10% PEI-PET resins, the preform temperatures at the cold end of the blow-molding window are lower than the preform temperatures for the 2.5% PEI-PET resins. The addition of ETMP and solid-stating the resin to high IV (0.90) somewhat reduces the cold end of the blow-molding window, but not sufficiently to offset the overall improvement realized by use of 10% PEI-PET resins prepared according to the invention.

Figure 5:
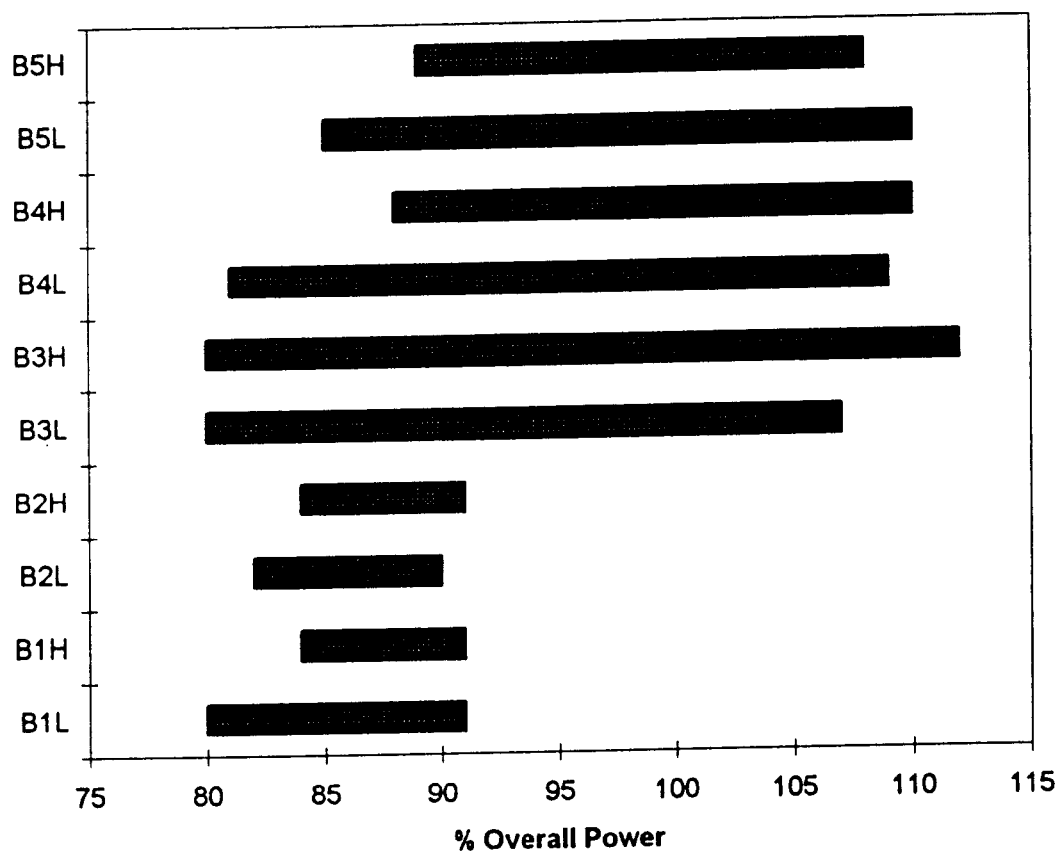
FIG. 5 illustrates the percent overall power at blow-molding window for the series of PEI-PET resins of Example B.
Figure 6:
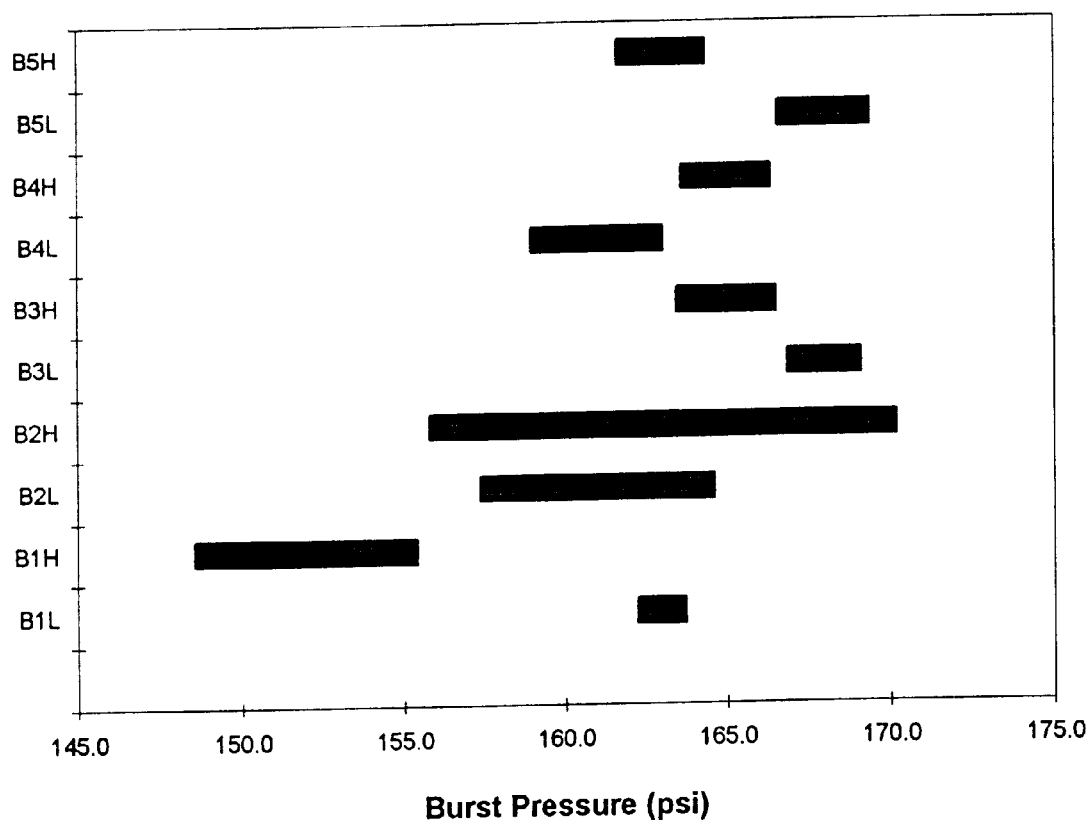
FIG. 6 illustrates bottle burst test data for the series of PEI-PET resins of Example B, the bar widths denoting 95% confidence intervals.

FIG. 5 illustrates the overall power requirement for the resins of Example B at the blow-molding window FIG. 6 illustrates the bottle burst data for bottles prepared using the resins of Example B. Although it was expected that increased levels of PIA would result in bottles having a reduced burst pressure because of a decrease in crystallinity, the 10% PEI-PET resins exhibited burst pressures that were similar to or greater than the burst pressure of low PIA resins.

Figure 7:
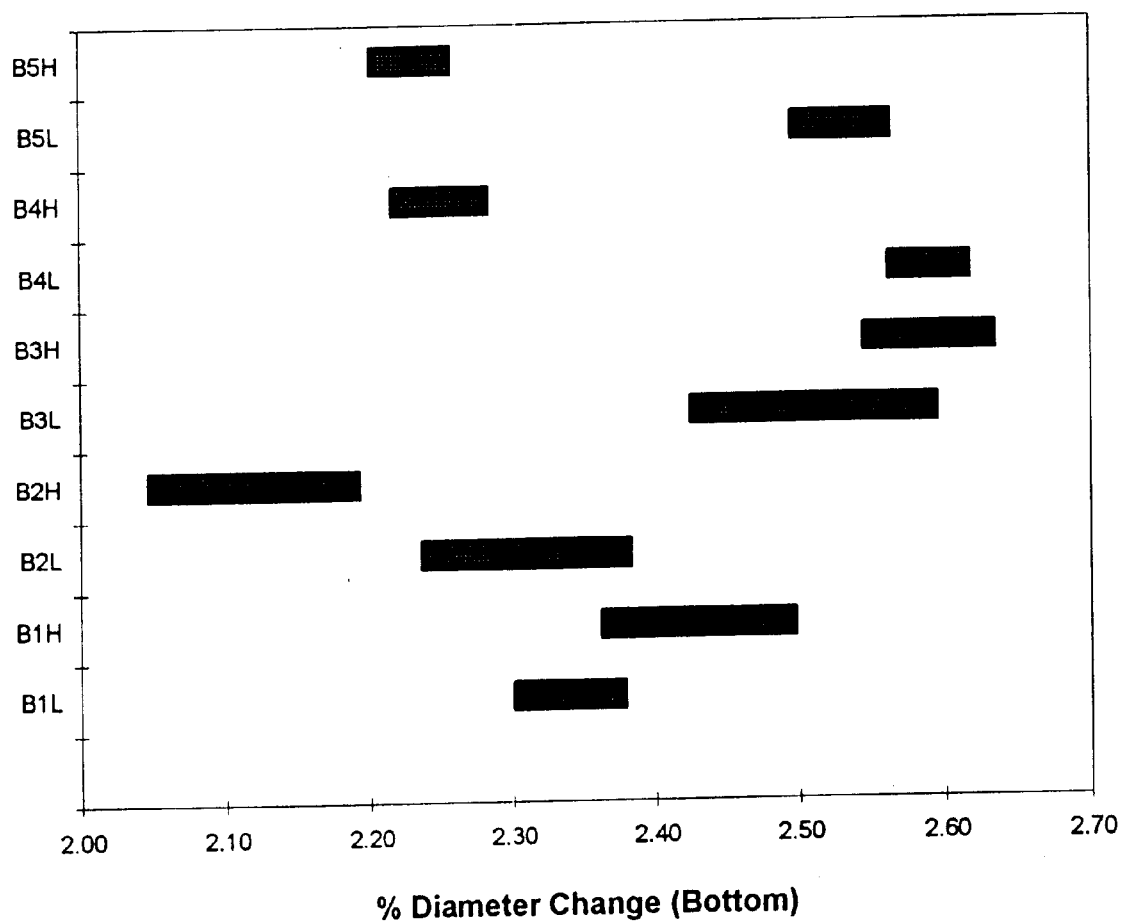
FIG. 7 illustrates bottle creep data for the series of PEI-PET resins of Example B, the bar widths denoting 95% confidence windows.

FIG. 7 illustrates the bottle creep data for the resins of Example B. While it was expected that increasing the amount of PIA in a resin would result in increased creep, the data indicate that the addition of 1500 ppm ETMP to 10% PEI-PET resins and solid-stating the resins to 0.90 IV results in resins with creep values similar to those of the 2.5% PEI-PET resins. This equivalence of creep performance was expected from the natural stretch ratio data illustrated in FIG. 2.

Figure 8:
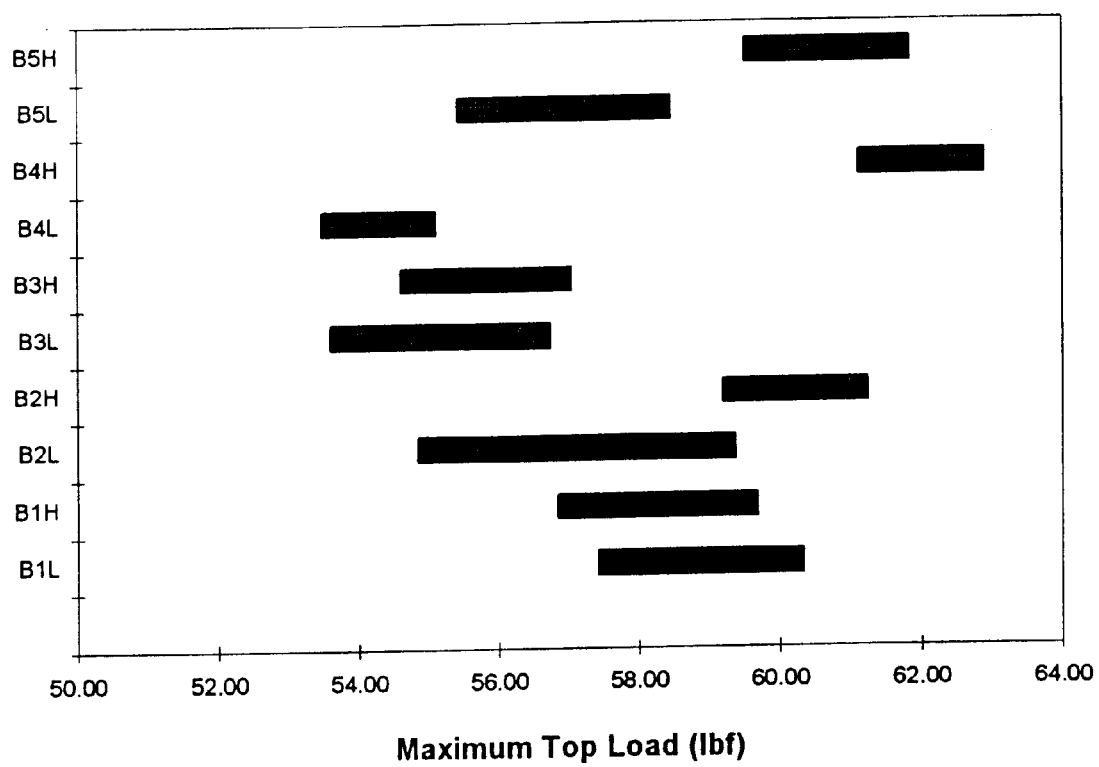
FIG. 8 illustrates bottle top load data for the series of PEI-PET resins of Example B, the bar widths denoting 95% confidence windows.

FIG. 8 illustrates the bottle top load data for the resins of Example B. While it was expected that increasing the level of PIA in a PEI-PET resin would decrease the top load crush pressure, the data indicates that the addition of 1500 ppm ETMP and solid-stating the resin to 0.90 IV (B4H and B5H resins) resulted in 10% PEI-PET resins with top load crush pressures similar to those of the 2.5% PEI-PET resins without ETMP. These results were also expected from the natural stretch ratio data of FIG. 2.

Figure 9:
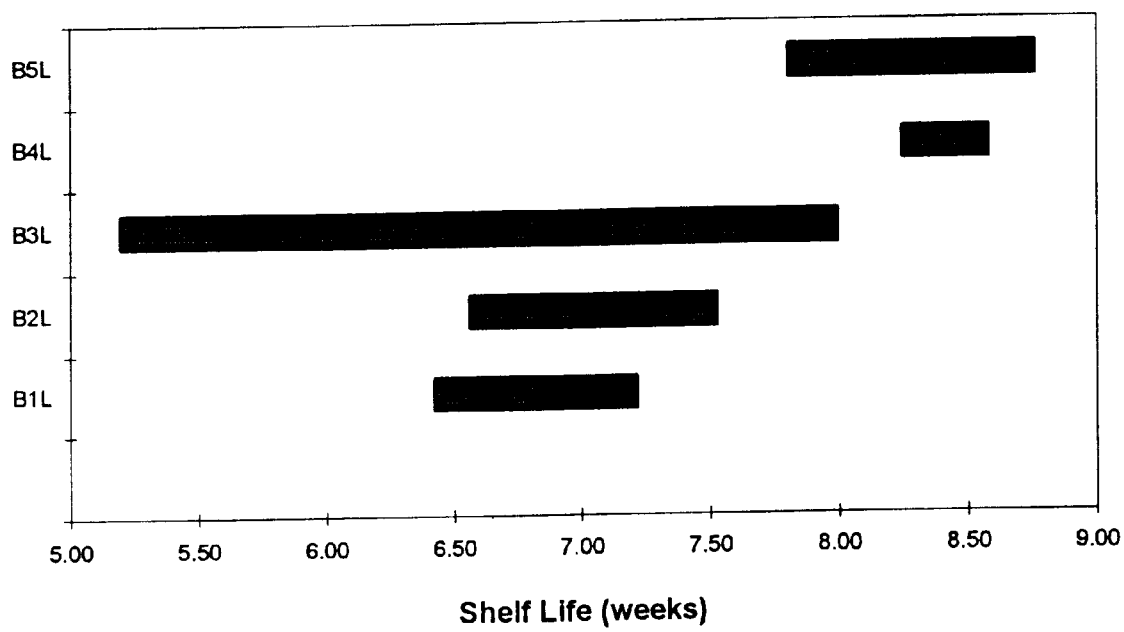
FIG. 9 illustrates gas barrier data for the 0.84 IV, PEI-PET resins of Example B. the bar widths denoting 95% confidence intervals.
Figure 10:
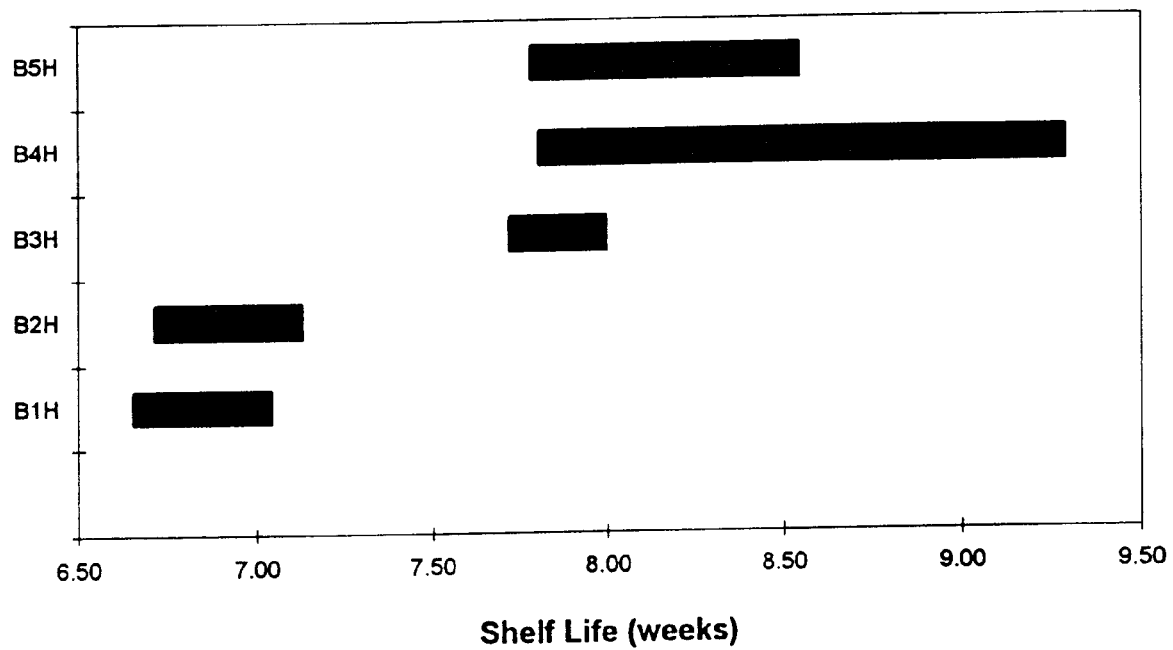
FIG. 10 illustrates gas barrier data for the 0.90 IV, PEI-PET resins of Example B, the bar widths denoting 95% confidence intervals.
Figure 11:
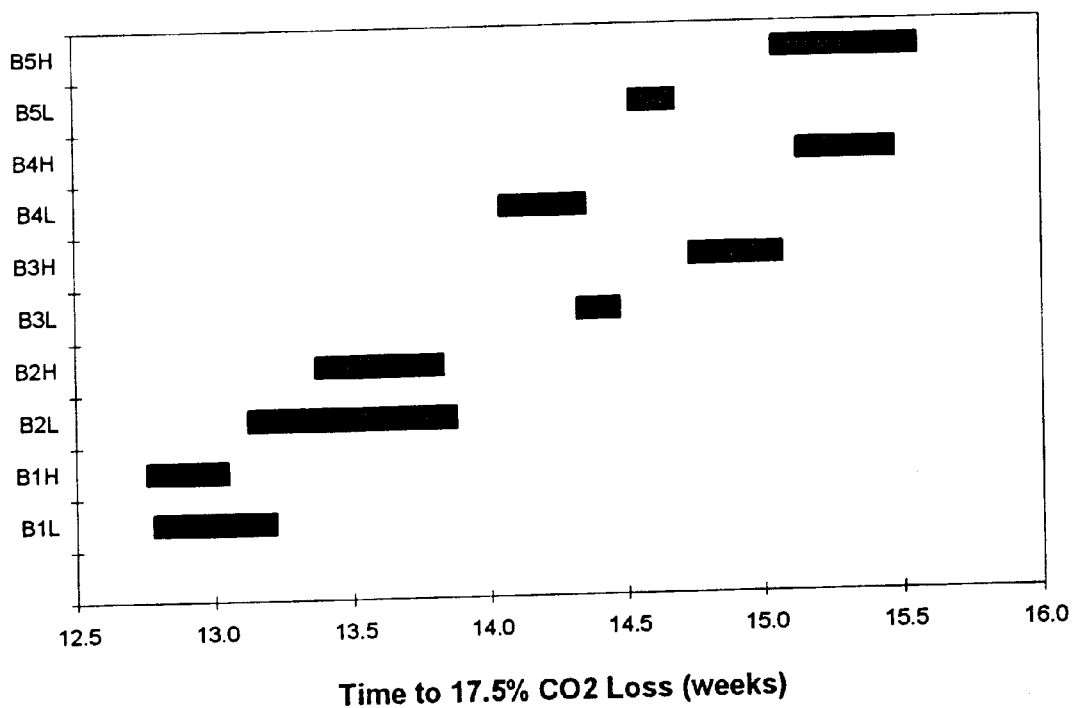
FIG. 11 illustrates the projected shelf life of $CO_2$ containing fluids in bottles made from the 10% PEI-PET and other resins of Example B as determined by FTIR spectroscopy.

FIG. 9–11 present data on the barrier characteristics of 10% PEI-PET resins such as B4H and B5H, which resins have been found to be equivalent to or better than currently used resins. For example, using a Mocon Permatran C-200 permeability tester, $CO_2$ barrier data indicates that bottles prepared using 10% PEI-PET resins exhibit about 25% improvement in $CO_2$ retention as compared to bottles prepared using standard 2.5% PEI-PET resin. Historically, $CO_2$ permeability (barrier) data is reflective of carbonated bottled beverage shelf life and distinguishes $CO_2$ permeability performance among resins.

FIG. 9 illustrates the barrier data obtained from the Mocon unit for 0.84 IV, 2.5% and 10% PEI-PET resins. The data indicates that incorporation of 1500 ppm ETMP to the 10% PEI-PET resin recipe improves the barrier properties as represented by the extended shelf life of resins B5L and B4L.

FIG. 10 illustrates the barrier data obtained from the Mocon unit for 0.90 IV, 2.5% and 10% PEI-PET resins. All 0.90 IV resins exhibit superior barrier performance relative to the 2.5% PEI-PET resins.

FIG. 11 illustrates the projected shelf life of $CO_2$ containing fluids in bottles made from the 10% PEI-PET and the other resins of Example B as determined by FTIR (Fourier Transform Infrared) spectroscopy.

We claim:

1. A resin composition comprising: about 1 mole % to about 30 mole % polyisophthalic acid diester, about 70 mole % to about 99 mole % polyterephthalic acid diester, about 250 ppm to about 5000 ppm chain-branching agent, and about 50 ppm to about 5000 ppm nucleating agent, wherein said nucleating agent is selected from the group consisting of: silica, fumed silica, clay, colloidal silica, silica beads and organic carboxylic acid salts.

2. The composition according to claim 1, wherein the polyisophthalic acid diester is about 8% to about 20% and the polyterephthalic acid diester is about 80% to about 92%, the chain-branching agent is about 50 to about 3000 ppm, and the nucleating agent is about 50 to about 2000 ppm.

3. The composition according to claim 2, wherein the chain-branching agent selected from the group consisting of:
    (a) polyfunctional alcohols having three or more hydroxyl functional groups;
    (b) pentaerythritol; and
    (c) polycarboxylates, and their acid precursors and anhydrides.

4. The composition according to claim 3, wherein the chain-branching agent is selected from the group consisting of:
    (a) about 250 to about 1000 ppm pentaerythritol and
    (b) about 1000 to about 3000 ppm trimethylolpropane ethoxylate.

5. The composition according to claim 3, wherein the nucleating agent is selected from the group consisting of:
    (a) the alkali and alkaline-earth metals salts of $C_8$–$C_{20}$ aliphatic and $C_7$–$C_{10}$ aromatic monocarboxylic acids and
    (b) fumed silica.

6. The composition according to claim 5, wherein the nucleating agent is selected from the group consisting of:
    (a) the alkali and alkaline-earth metal salts of a $C_{16}$–$C_{20}$ aliphatic monocarboxylic acid, benzoic acid, methylbenzoic acid, dimethylbenzoic acid and napthanoic acid, and
    (b) fumed silica.

7. The composition according to claim 6, wherein the nucleating agent is selected from the group consisting of:
    (a) sodium stearate, sodium benzoate, potassium stearate and potassium benzoate, and
    (b) fumed silica.

8. The composition according to claim 1, wherein the nucleating agent particle size is about 0.1 micron to about 500 microns.

9. The composition according to claim 6, wherein the nucleating agent particle size is about 50 to about 250 microns if from 6 (a), and about 0.1 to about 3 microns if from 6 (b).

10. The composition according to claim 7, wherein the nucleating agent particle size is about 50 to about 250 microns if from 7 (a), and about 0.1 to about 3 microns if from 7 (b).

11. The composition according to claim 9, wherein the intrinsic viscosity of the composition is about 0.7 to about 1.2.

12. The composition according to claim 11, wherein the intrinsic viscosity of the composition is about 0.85 to about 1.0.

13. The composition according to claim 10, wherein the intrinsic viscosity of the composition is about 0.7 to about 1.2.

14. The composition according to claim 13, wherein the intrinsic viscosity of the composition is about 0.85 to about 1.0.

15. A resin composition comprising about 8 mole % to about 20 mole % polyethylene isophthalate, about 80 mole % to about 92 mole % polyethylene terephthalate, about 250 to about 5000 ppm chain-branching agent, and about 50 ppm to about 5000 ppm nucleating agent, and an intrinsic viscosity of about 0.7 to about 1.2, wherein said nucleating agent is selected from the group consisting of: silica, fumed silica, clay, colloidal silica, silica beads and organic carboxylic acid salts.

16. The composition according to claim 15, wherein the chain-branching agent is selected from the group consisting of:
   (a) polyfinctional alcohols having three or more hydroxyl finctional groups;
   (b) pentaerythritol; and
   (c) polycarboxylates, and their acid precursors and anhydrides.

17. The composition according to claim 16, wherein the chain-branching agent is selected from the group consisting of:
   (a) about 250 to about 1000 ppm pentaerythritol and
   (b) about 1000 to about 3000 ppm trimethylolpropane ethoxylate.

18. The composition according to claim 15, wherein the nucleating agent is selected from the group consisting of:
   (a) the alkali and alkaline-earth metals salts of $C_8$–$C_{20}$ aliphatic and $C_7$–$C_{10}$ aromatic monocarboxylic acids, and
   (b) fumed silica.

19. The composition according to claim 18, wherein the nucleating agent is selected from the group consisting of;
   (a) the alkali and alkaline-earth metal salts of a $C_{16}$–$C_{20}$ aliphatic monocarboxylic acid, benzoic acid, methylbenzoic acid, dimethylbenzoic acid and napthanoic acid, and
   (b) fumed silica.

20. The composition according to claim 19, wherein the nucleating agent is selected from the group consisting of:
   (a) sodium stearate, sodium benzoate, potassium stearate and potassium benzoate, and
   (b) fumed silica.

21. The composition according to claim 18, wherein the nucleating agent particle size is about 0.1 to about 500 microns.

22. The composition according to claim 19, wherein the nucleating agent particle size is about 50 to about 250 microns if from 19 (a) and about 0.1 to about 3 microns if from 19 (b).

23. The composition according to claim 20, wherein the nucleating agent particle size is about 50 to about 250 microns if from 20 (a) and about 0.1 to about 3 microns if from 20 (b).

24. The composition according to claim 15, wherein the intrinsic viscosity of the composition is about 0.85 to about 1.1.

25. The composition according to claim 19, wherein the intrinsic viscosity of the composition is about 0.85 to about 1.1.

26. The resin composition according to claim 20, wherein the intrinsic viscosity is about 0.85 to about 1.1.

27. A resin composition comprising about 8mole % to about 20mole % polyethylene-isophthalate, about 80mole % to about 92mole % polyethylene terephthalate, about 1200 to about 3000 ppm ethoxylated trimethylolpropane, and about 50 to about 2000 ppm nucleating agent selected from the group consisting of
   (a) the sodium and potassium salts of a $C_{16}$–$C_{20}$ aliphatic monocarboxylic acid, benzoic acid, methylbenzoic acid, dimethylbenzoic acid and napthanoic acid, and
   (b) fumed silica;
   wherein the resin composition has an intrinsic viscosity of about 0.85 to about 1.0.

28. The resin according to claim 27, wherein the nucleating agent particle size is about 50 to about 250 microns if from 27 (a) and from about 0.1 to about 3 microns if from 27 (b).

29. A resin composition comprising about 8mole % to about 12mole % polyethylene-isophthalate, about 88mole % to about 92mole % polyethylene terephthalate, about 1200 to about 3000 ppm ethoxylated trimethylolpropane, and about 0.05mole % to about 0.2mole % nucleating agent selected from the group consisting of
   (a) the sodium and potassium salts of a $C_{16}$–$C_{20}$ aliphatic monocarboxylic acid, benzoic acid, methylbenzoic acid, dimethylbenzoic acid and napthanoic acid, and
   (b) fumed silica;
   wherein the resin composition has an intrinsic viscosity of about 0.85 to about 1.0.

30. The resin according to claim 29, wherein the nucleating agent particle size is about 50 to about 250 microns if from 29(a) and about 0.1 to about 3 microns if from 29 (b).

31. A process for making a polyethylene terephthalate-polyethylene isophthalate resin compositions useful for forming shaped articles, said process comprising:
   (a) mixing in a batch or continuous reactor vessel substances comprising:
      (i) about 8mole % to about 20mole % polyethylene isophthalate;
      (ii) about 80mole % to about 92mole % polyethylene terephthalate;
      (iii) about 250 to about 5000 ppm of a chain-branching agent selected from the group consisting of:
         (a) polyfunctional alcohols having three or more hydroxyl functional groups;
         (b) pentaerythritol; and
         (c) polycarboxylates, and their acid precursors and anhydrides;
      (iv) about 1mole % to about 2mole % diethylene glycol or diethylene glycol dimethyl ether; and
      (v) selected amounts of catalysts selected from the group consisting of cobalt, manganese and antimony;
   (b) reacting for a selected time and at a selected temperature the mixture of step (a) to form a homogeneous polyethylene isophthalate-polyethylene terephthalate resin composition,
   wherein optionally during said reaction, volatile substances are removed from the reaction mass, either continuously or periodically, by application of reduced pressure;
   (c) stabilizing the reaction of step (b) by addition of a selected quantity of a selected phosphorus-containing stabilizing agent; and
   (d) optinalyy, solid-stating the product of step (c) to obtain a polyethylene isophthalate-polyethylene terephthalate resin composition having an intrinsic viscosity of about 0.85 to about 0.95;
   wherein from about 50 to about 3000 ppm of a nucleating agent is added to either of steps (a) or (d), said nucleating agent being selected from the group consisting of:
      (a) the alkali and alkaline-earth metals salts of $C_8$–$C_{20}$ aliphatic and $C_7$–$C_{10}$ aromatic monocarboxylic acids, and
      (b) fumed silica.

32. The composition according to claim 31, wherein the nucleating agent is selected from the group consisting of;
   (a) the alkali and alkaline-earth metal salts of a $C_{16}$–$C_{20}$ aliphatic monocarboxylic acid, benzoic acid, methylbenzoic acid, dimethylbenzoic acid and napthanoic acid, and (b) fumed silica.

33. The composition according to claim 32, wherein the nucleating agent is selected from the group consisting of:
  (a) sodium stearate, sodium benzoate, potassium stearate and potassium benzoate, and
  (b) fumed silica.

34. The process according to claim 31, wherein the amount of the chain-branching agent is about 250 ppm to about 3000 ppm.

35. The process according to claim 31, wherein the amount of polyethylene terephthalate is from about 88% to about 92%, and the amount of polyethylene isophthalate is about 8% to about 12%.

36. The process according to claim 31, wherein the selected temperature of step (b) is about 260 to about 300° C.

37. The process according to claim 36, wherein the selected temperature of step (b) is about 270 to about 290° C.

38. The process according to claim 31, wherein the shaped article is a polyethylene isophthalate-polyethylene terephthalate vessel suitable for containing liquids.

39. A process for making a polyethylene terephthalate-polyethylene isophthalate resin compositions useful for forming shaped articles, said process comprising:
  (a) mixing in a batch or continuous reactor vessel substances comprising:
    (i) about 8mole % to about 20mole % a substance selected from the group consisting of terephthalic acid and non-polymeric diesters thereof;
    (ii) about 80mole % to about 92mole % of a substance selected from the group consisting of isophthalic acid and non-polymeric diesters thereof,
    (iii) a diol in sufficient quantity to react with the total molar amount of (i) and (ii),
    (iv) about 250 to about 5000 ppm of a chain-branching agent selected from the group consisting of:
      (a) polyfunctional alcohols having three or more hydroxyl functional groups;
      (b) pentaerythritol; and
      (c) polycarboxylates, and their acid precursors and anhydrides;
    (v) about 1% to about 2% diethylene glycol or diethylene glycol dimethyl ether; and
    (vi) selected amounts of catalysts selected from the group consisting of cobalt, manganese and antimony;
  (b) reacting for a selected time and at a selected temperature the mixture of step (a) to form a homogeneous polyethylene isophthalate-polyethylene terephthalate resin composition,
  wherein optionally during said reaction, volatile substances are removed from the reaction mass, either continuously or periodically, by application of reduced pressure;
  (c) stabilizing the reaction of step (b) by addition of a selected quantity of a selected phosphorus-containing stabilizing agent; and
  (d) optionally, solid-stating the product of step (c) to obtain a poly(isophthalate-terephthalate) resin composition having an intrinsic viscosity of about 0.85 to about 1.0;

wherein from about 50 to about 3000 ppm of a nucleating agent is added to either of steps (a) or (d), said nucleating agent being selected from the group consisting of:
    (a) the alkali and alkaline-earth metals salts of $C_8$–$C_{20}$ aliphatic and $C_7$–$C_{10}$ aromatic monocarboxylic acids, and
    (b) fumed silica; and
  wherein using the product of step (d) is used in a selected process to make a shaped article.

40. The composition according to claim 39, wherein the nucleating agent is selected from the group consisting of;
  (a) the alkali and alkaline-earth metal salts of a $C_{16}$–$C_{20}$ aliphatic monocarboxylic acid, benzoic acid, methylbenzoic acid, dimethylbenzoic acid and napthanoic acid, and
  (b) fumed silica.

41. The composition according to claim 40, wherein the nucleating agent is selected from the group consisting of
  (a) sodium stearate, sodium benzoate, potassium stearate and potassium benzoate, and
  (b) fumed silica.

42. The process according to claim 39, wherein the amount of the chain-branching agent is about 250 ppm to about 3000 ppm.

43. The process according to claim 39, wherein the amount of terephthalic acid or non-polymeric diester is from about 88% to about 92%, and the amount of isophthalic acid or non-polymeric diester is about 8% to about 12%.

44. The process according to claim 39, wherein the selected temperature of step (b) is about 260 to about 300° C.

45. The process according to claim 44, wherein the selected temperature of step (b) is about 270 to about 290° C.

46. The process according to claim 39, wherein the intrinsic viscosity of the resin composition is from about 0.7 to about 1.2.

47. The process according to claim 46, wherein the intrinsic viscosity of the resin composition is from about 0.85 to about 1.0.

48. The process according to claim 40, wherein the intrinsic viscosity of the resin composition is from about 0.7 to about 1.2.

49. The process according to claim 48, wherein the intrinsic viscosity of the resin composition is from about 0.7 to about 1.0.

50. The process according to claim 41, wherein the intrinsic viscosity of the resin composition is from about 0.7 to about 1.2.

51. The process according to claim 50, wherein the intrinsic viscosity of the resin composition is from about 0.7 to about 1.0.

52. The process according to claim 39, wherein the shaped article is a polyethylene isophthalate-polyethylene terephthalate vessel suitable for containing liquids.

* * * * *